United States Patent
Emmanouil et al.

(10) Patent No.: US 11,313,276 B2
(45) Date of Patent: Apr. 26, 2022

(54) SUPERSONIC GAS TURBINE ENGINE

(71) Applicants: Rolls-Royce Deutschland Ltd & Co KG, Blankenfelde-Mahlow (DE); Rolls-Royce plc, London (GB)

(72) Inventors: Konstantinos Emmanouil, Berlin (DE); Robert Goulds, Derby (GB)

(73) Assignees: Rolls-Royce Deutschland Ltd & Co KG, Blankenfelde-Mahlow (DE); Rolls-Royce PLC, London (GB)

( * ) Notice: Subject to any disclaimer, the term of this patent is extended or adjusted under 35 U.S.C. 154(b) by 0 days.

(21) Appl. No.: 16/943,184

(22) Filed: Jul. 30, 2020

(65) Prior Publication Data

US 2021/0087971 A1 Mar. 25, 2021

(30) Foreign Application Priority Data

Aug. 1, 2019 (DE) .................... 10 2019 120 834.3

(51) Int. Cl.
*F02C 7/04* (2006.01)
*F02C 7/18* (2006.01)
*F02K 3/06* (2006.01)

(52) U.S. Cl.
CPC ............... *F02C 7/04* (2013.01); *F02C 7/185* (2013.01); *F02K 3/06* (2013.01); *F05D 2220/323* (2013.01); *F05D 2260/213* (2013.01); *F05D 2260/606* (2013.01)

(58) Field of Classification Search
CPC .... F02C 7/04; F02C 7/12; F02C 7/185; F02C 9/18; F02K 3/06; F02K 1/822; F05D 2220/323; F05D 2260/213; F05D 2260/606
See application file for complete search history.

(56) References Cited

U.S. PATENT DOCUMENTS

| | | | |
|---|---|---|---|
| 4,187,675 | A | 2/1980 | Wakeman |
| 5,351,476 | A | 10/1994 | Laborie et al. |
| 2008/0095611 | A1 | 4/2008 | Storage et al. |
| 2009/0007570 | A1 | 1/2009 | Ranganathan |
| 2010/0162679 | A1 | 7/2010 | Khalid |
| 2011/0185731 | A1 | 8/2011 | Mylemans |

(Continued)

OTHER PUBLICATIONS

German Search Report dated Mar. 17, 2020 from counterpart German Patent Application No. 10 2019 120 834.3.

(Continued)

*Primary Examiner* — Steven M Sutherland
(74) *Attorney, Agent, or Firm* — Shuttleworth & Ingersoll, PLC; Timothy Klima (57) ABSTRACT

A supersonic gas turbine engine for an aircraft that comprises a nacelle, a fan, an engine core including a primary duct configured to guide a core airflow through the engine core, a bypass duct extending between the engine core and an engine casing and configured to guide a bypass airflow through the bypass duct, an intake located upstream of the fan, and a tertiary airflow duct extending between the engine casing and the nacelle and configured to guide a tertiary airflow. The intake is configured to extract air from the intake and guide it to the tertiary airflow duct in which the extracted air flows as tertiary airflow. It is provided that at least one heat exchanger is mounted in the tertiary airflow duct.

20 Claims, 11 Drawing Sheets (56) References Cited

U.S. PATENT DOCUMENTS

| | | | |
|---|---|---|---|
| 2012/0000205 A1 | 1/2012 | Coffinberry et al. | |
| 2012/0144842 A1* | 6/2012 | Snyder | F02C 7/14 |
| | | | 60/785 |
| 2012/0285138 A1 | 11/2012 | Todorovic | |
| 2014/0026592 A1* | 1/2014 | Beier | F01D 25/20 |
| | | | 60/796 |
| 2014/0216056 A1* | 8/2014 | Schwarz | B64D 33/12 |
| | | | 60/806 |
| 2014/0271116 A1* | 9/2014 | Snyder | F02C 7/18 |
| | | | 415/1 |
| 2014/0341704 A1* | 11/2014 | Fletcher | F02C 7/141 |
| | | | 415/1 |
| 2018/0050810 A1* | 2/2018 | Niergarth | F01D 15/12 |
| 2019/0218973 A1 | 7/2019 | Schwarz et al. | |

OTHER PUBLICATIONS

Moheisen, R.M., "Transport phenomena in fluid dynamics; Matrix heat exchangers and their applications in energy systems", Air Force Research Laboraboty, AFRL-RX-TY-TR-2010-0053.

* cited by examiner

SUPERSONIC GAS TURBINE ENGINE

This application claims priority to German Patent Application DE102019120834.3 filed Aug. 1, 2019, the entirety of which is incorporated by reference herein.

DESCRIPTION

The present disclosure relates to a supersonic gas turbine engine.

Heat management of fuel and oil is a particular challenge in supersonic gas turbine engines since the engines may operate—compared to a subsonic gas turbine engine—at a higher cruise power and higher fuel tank temperature caused by heating from flying at high speed for long periods of time. In particular, flying at supersonic speeds increases the temperature of the air entering the engine to just below the stagnation temperature such that use of such air further back along the engine as a cooling medium for cooling oil is less efficient. Also, fuel that is typically used to additionally cool the oil has an increased temperature at higher Mach numbers such that it is also less efficient for cooling.

Document US 2009/0007570 A1 discloses to locate a heat exchanger between an inner fan casing and an outer fan casing of a subsonic gas turbine engine, wherein the inlet of the heat exchanger opens towards the engine bypass channel and the outlet of the heat exchanger opens towards ambient air. The air that is cooled by the heat exchanger is air discharged from the fan assembly.

The problem underlying the present invention is to provide for efficient cooling within a supersonic gas turbine engine.

This problem is solved by a supersonic gas turbine engine with the features as disclosed herein. Embodiments of the invention are also disclosed herein.

According to an aspect of the invention, a supersonic gas turbine engine is provided which comprises a nacelle, a fan, an engine core, a bypass duct, an intake and a tertiary airflow duct. The engine core is located downstream of the fan and comprises a primary duct configured to guide a core airflow through the engine core. The bypass duct is located downstream of the fan and extends between the engine core and an engine casing and is configured to guide a bypass airflow through the bypass duct. The intake is located upstream of the fan. The tertiary airflow duct is extending between the engine casing and the nacelle and is configured to guide a tertiary airflow. The intake is configured to extract air from the intake and guide it to the tertiary airflow duct, wherein the extracted air flows as tertiary airflow through the tertiary airflow duct.

It is further provided that at least one heat exchanger is mounted in the tertiary airflow duct.

Accordingly, aspects of the present invention are based on the idea to arrange a heat exchanger in the tertiary airflow duct, wherein the at least one heat exchanger is configured such that a fluid of the heat exchanger to be cooled is cooled by the tertiary airflow. Thereby, a fluid to be cooled by the heat exchanger is cooled by the coolest air available to the engine at supersonic conditions. Different than bypass air that is further heated by the compression of the air by the fan, air of the tertiary airflow extracted from the intake is relatively cool. This allows for efficient cooling in the supersonic gas turbine engine.

While the tertiary airflow duct extends between the engine casing and the nacelle, the tertiary airflow duct also extends upstream of the engine casing, e.g., between a fan casing arranged upstream of the engine casing and the nacelle. All of the duct structure that serves to guide the tertiary airflow in the axial direction is considered to form the tertiary airflow duct according to the present invention.

According to an embodiment, the at least one heat exchanger fills the entire annulus of the tertiary airflow duct in the circumferential direction. This allows for maximum cooling of the fluid to be cooled.

Alternatively, the at least one heat exchanger only partly fills the annulus of the tertiary airflow duct in the circumferential direction. For example, there are mounted a plurality of heat exchangers in the tertiary airflow duct, wherein the heat exchangers are arranged to have gaps between them in the circumferential direction. With the heat exchangers having gaps between them in the circumferential direction, the heat exchangers may be switched off when not required, while the airflow through the tertiary airflow duct can continue. This allows the air to flow within the tertiary airflow duct even when the heat exchangers are switched off such that air can continue to fulfill other functions.

According to a further embodiment, at least one arc shaped heat exchanger is provided in the tertiary airflow duct. The at least one arc shaped heat exchanger extends less than 360 degrees in the circumferential direction. In embodiments, several arc shaped heat exchangers are provided which extend in the circumferential direction for an angular range that lies in the interval between 30 degrees and 90 degrees.

According to an embodiment, the at least one heat exchanger fills the entire annulus of the tertiary airflow in the radial direction. Accordingly, it extends radially between the engine casing and the nacelle.

Alternatively, the at least one heat exchanger only partly fills the annulus of the tertiary airflow in the radial direction. This can be achieved in a plurality of ways. In one embodiment, the at least one heat exchanger is mounted to the inner wall of the nacelle. In such case, the heat exchanger may be a surface cooler type of heat exchanger that comprises fins that extend towards the engine casing.

In a further embodiment, the at least one heat exchanger is mounted to the outer wall of the engine casing. In such case, the heat exchanger may be a surface cooler type of heat exchanger that comprises fins that extend towards the nacelle.

In a still further embodiment, the at least one heat exchanger is located midway between the engine casing and the nacelle. In such case, the heat exchanger may be a surface cooler type of heat exchanger that comprises fins that extend both towards the nacelle and towards the engine casing. In such embodiment, cooling is particularly efficient.

It is provided that the intake is configured to extract air from the intake and guide it to the tertiary airflow duct. This can be achieved in a plurality of manners. In one embodiment, the inner wall of the intake that surrounds the inlet to the gas turbine engine comprises bleed holes, wherein air bled from the intake bleed holes is guided to the tertiary airflow duct. In a further embodiment, the intake comprises an intake centerbody with bleed holes, wherein bleed air from the intake centerbody bleed holes is guided through a front mounting frame located upstream of the fan to the tertiary airflow duct. Such front mounting frame comprising struts connecting the frame with a fan casing, wherein the bleed air is guided through the struts. The front mounting frame is a fixed structure located upstream of the fan.

According to a further embodiment, the heat exchanger extends over a part of the circumference of the tertiary airflow duct, wherein an accessory gearbox is mounted in and extends over another part of the tertiary airflow duct. For example, the heat exchanger is located in the upper half of the tertiary airflow duct, wherein the accessory gearbox is located in the lower half of the tertiary airflow duct. Such embodiment allows to arrange further functional parts such as an accessory gearbox in the tertiary airflow duct.

In an embodiment, the heat exchanger is implemented as a matrix cooler type of heat exchanger. In such case, the heat transfer surface is formed by a three-dimensional structure. More particularly, according to one implementation, a matrix cooler in the sense of the present disclosure may be implemented as a "shell and tube heat exchanger" in which one fluid passes through predefined cooling tubes/passages whereas the other fluid (namely, the air in the tertiary airflow duct) flows freely and is only bounded by the outer shell of the heat exchanger.

According to another implementation, a matrix cooler in the sense of the present invention may be a stack of alternating perforated plate-spacer pairs which are bonded together to form leak free passages which allow two flow streams to exchange heat. The perforated plates are made of high thermal conductivity materials and are used as an intermediary to transfer heat between two fluid streams. The spacers are made of less thermally conductive material and are used to inhibit axial conduction and enable flow redistribution. When the fluids pass through the perforated plate, heat is exchanged between the plate and each fluid. The perforated plate surface area consists of the front and back of the plate as well as the inner wall surface area of each perforation. The large surface area of each perforated plate gives the matrix heat exchanger a large surface area to volume ratio, enabling compact exchangers with high heat transfer. Such matrix cooler is described, e.g., in document Moheisen, R. M.: "TRANSPORT PHENOMENA IN FLUID DYNAMICS: MATRIX HEAT EXCHANGERS AND THEIR APPLICATIONS IN ENERGY SYSTEMS", Air Force Research Laboratory, AFRL-RX-TY-TR-2010-0053.

In a further embodiment, the heat exchanger is implemented as a surface cooler or plate cooler type of heat exchanger. In such case, the heat transfer surface is mainly formed by a surface or plate, wherein in case of a surface cooler in addition to a plate cooling fins are provided.

The kind of heat exchanger that is used in a specific implementation depends on the pressure drop that is allowed to take place in the tertiary airflow duct caused by the heat exchanger and further depends on the amount of cooling that is to be realized.

In this respect, it is pointed out that the present invention is not limited to any kind of particular heat exchanger. Any form of heat exchanger that enables air to extract heat from a fluid system can be used in the context of the present invention. For example, the heat exchanger may be configured as a full or partial counter flow heat exchanger or full or partial parallel flow heat exchanger or as a crossflow heat exchanger.

The heat exchanger may be connected to a fluid system, e.g., an oil system, wherein the fluid of the fluid system is cooled by the tertiary airflow. According to an embodiment, fluid pipes and/or other conductors are guided from an accessory gearbox that is mounted to a core engine casing through struts or vanes across the bypass duct to the heat exchanger. From the heat exchanger, it is returned through such struts or vanes to the accessory gearbox. The struts may be structural struts or non-structural struts (also referred to as services splitter fairings). The vanes may be the vanes of an outlet guide vane (OGV) located in the bypass duct.

According to another embodiment, fluid pipes and/or other conductors are guided within the tertiary flow duct from an accessory gearbox around the outside of the engine casing to the heat exchanger, wherein the accessory gearbox is also arranged in the tertiary airflow duct and mounted to a fan casing located upstream of the engine casing or to the engine casing. In such embodiment, in which the accessory gearbox is not mounted to the core engine but to the fan casing or engine casing, the fluid pipes and/or other conductors do not need to cross the bypass duct and are simply guided outside of the engine casing to the heat exchanger.

According to a further aspect of the invention, a supersonic gas turbine engine for an aircraft is provided which comprises a nacelle, a fan, an engine core, and a bypass duct that extends between the engine core and an engine casing. It is further provided that at least one heat exchanger is mounted on the external surface of the nacelle.

This aspect of the invention is based on the idea to have a fluid cooled by the external boundary layer flow passing the outside of the supersonic gas turbine engine. To avoid turbulence, in an embodiment, the heat exchanger is flat and may be formed as a surface cooler type of heat exchanger or plate cooler type of heat exchanger. This aspect of the invention uses air for cooling that has received the least amount of heating possible at that point in the engine, as the air has only been heated in that it goes through isentropic expansion caused by the shock wave itself.

The supersonic gas turbine engine with at least one flat heat exchanger mounted on the external surface of the nacelle may additionally comprise a tertiary airflow duct with a tertiary airflow as described above. In such case, the heat exchanger mounted to the outside of the nacelle may comprise cooling fins that extend radially inward into the tertiary airflow duct, thereby being cooled by the tertiary airflow.

It should be noted that the present invention is described in terms of a cylindrical coordinate system having the coordinates x, r and φ. Here x indicates the axial direction, r the radial direction and φ the angle in the circumferential direction. The axial direction is defined by the machine axis of the gas turbine engine, with the axial direction pointing from the engine inlet to the engine outlet. Starting from the x-axis, the radial direction points radially outwards. Terms such as "in front of" and "behind" refer to the axial direction or flow direction in the engine. Terms such as "outer" or "inner" refer to the radial direction.

Figure 1:
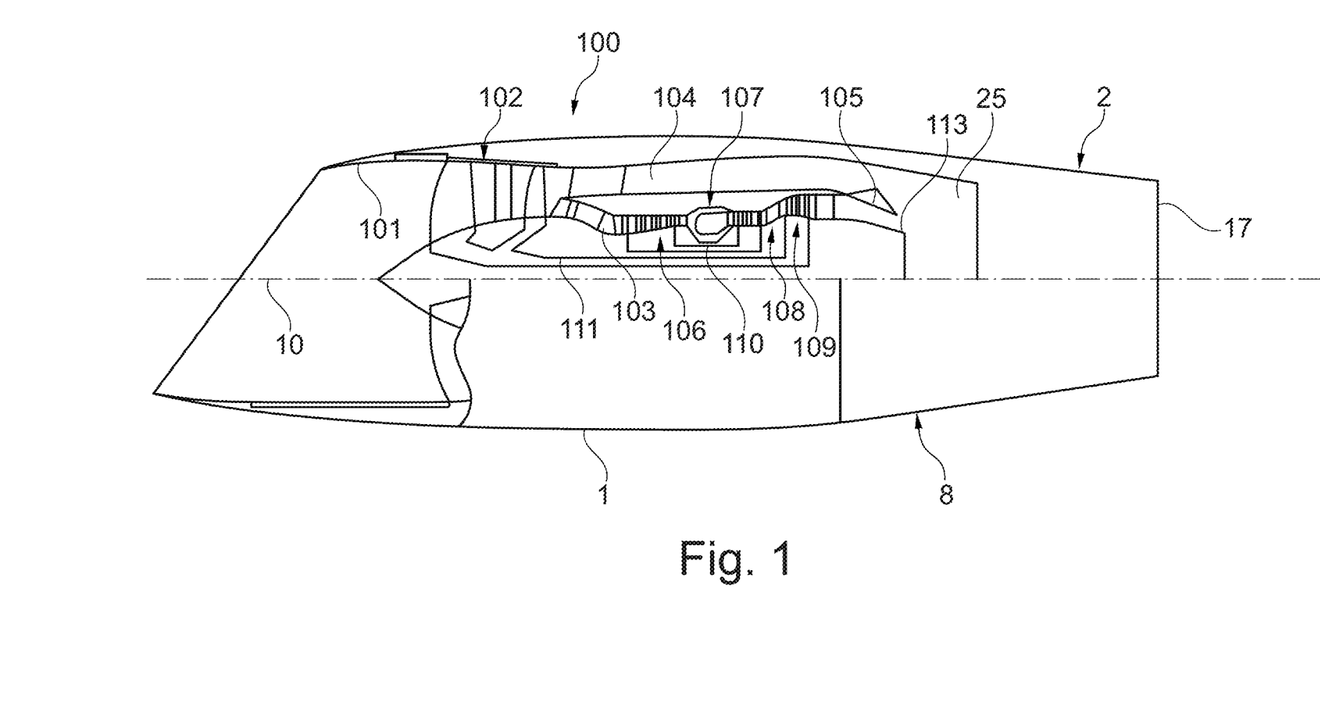
FIG. 1 is a schematic sectional side view of a supersonic gas turbine engine.

The invention will be explained in more detail on the basis of exemplary embodiments with reference to the accompanying drawings in which:

FIG. 1 shows a turbofan engine which is intended and suitable for use in a civil or military supersonic aircraft and, accordingly, is designed for operating conditions in the subsonic, transonic and supersonic ranges.

The turbofan engine 100 comprises an engine intake 101, a fan 102 which may be a multi-stage fan, a primary flow channel 103 which passes through a core engine, a secondary flow channel 104 which bypasses the core engine, a mixer 105 and a nozzle 2 in which a thrust reverser 8 can be integrated.

The turbofan engine 100 has a machine axis or engine centerline 10. The machine axis 10 defines an axial direction of the turbofan engine. A radial direction of the turbofan engine is perpendicular to the axial direction.

The core engine comprises a compressor 106, a combustion chamber 107 and a turbine 108, 109. In the example shown, the compressor comprises a high-pressure compressor 106. A low-pressure compressor is formed by the areas close to the hub of the fan 102. The turbine behind the combustion chamber 107 comprises a high-pressure turbine 108 and a low-pressure turbine 109. The high-pressure turbine 108 drives a high-pressure shaft 110 which connects the high-pressure turbine 108 with the high-pressure compressor 106. The low-pressure turbine 109 drives a low-pressure shaft 111 which connects the low-pressure turbine 109 with the multi-stage fan 102. According to an alternative design, the turbofan engine may also have a medium-pressure compressor, a medium-pressure turbine and a medium-pressure shaft. Furthermore, in an alternative design it can be provided that the fan 102 is coupled to the low-pressure shaft 111 via a reduction gearbox, e.g., a planetary gearbox.

The turbofan engine is arranged in an engine nacelle 1. The engine nacelle 1 may be connected to the aircraft fuselage via a pylon.

The engine intake 101 forms a supersonic air intake and is, therefore, designed and suitable for decelerating the incoming air to velocities below Ma 1.0 (Ma=Mach number). The engine inlet is beveled in FIG. 1, with the lower edge protruding from the upper edge, but other kinds of supersonic intakes may be implemented instead.

The flow channel through the fan 102 is divided behind the fan 102 into the primary flow channel 103 and the secondary flow channel 104. The secondary flow channel 104 is also referred to as the bypass channel.

Behind the core engine, the primary flow in the primary flow channel 103 and the secondary flow in the secondary flow channel 104 are mixed by the mixer 105. Furthermore, an outlet cone 113 is mounted behind the turbine in order to achieve desired cross-sections of the flow channel.

The rear area of the turbofan engine is formed by an integral nozzle 2, where the primary and secondary flows are mixed in the mixer 105 before being fed into the integral nozzle 2. The engine behind mixer 105 forms a flow channel 25, which extends through nozzle 2. Alternatively, separate nozzles can be provided for the primary flow channel 103 and the secondary flow channel 104 meaning that the flow through the secondary flow channel 104 has its own nozzle that is separate to and radially outside the core engine nozzle. One or both nozzles (whether mixed or split flow) may have a fixed or variable area.

In the context of this invention, the provision of a tertiary airflow duct guiding bleed air extracted from the intake 101 and the arrangement of a heat exchanger in such tertiary airflow duct is of relevance.

Figure 2:
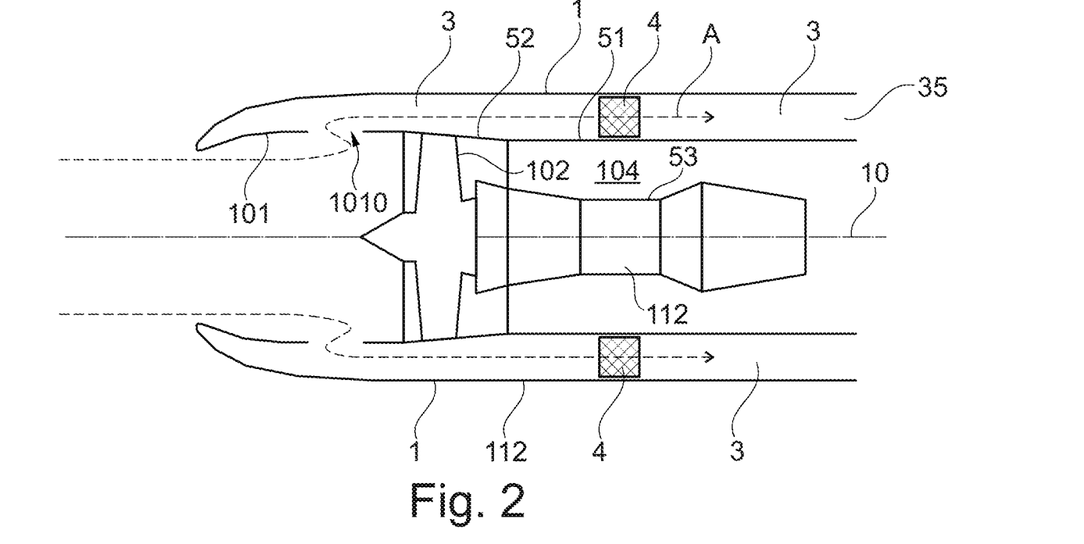
FIG. 2 is a schematic sectional side view of a first embodiment of a supersonic gas turbine engine that comprises a tertiary airflow duct with a heat exchanger, wherein the gas turbine engine comprises a first type of intake that extracts air and guides it to the tertiary airflow duct.

FIG. 2 shows a first embodiment of a supersonic gas turbine engine. The supersonic engine comprises a fan 102, an engine core 112 and a bypass duct 104. These components may be formed similar to the manner described with respect to FIG. 1. The engine core 112 comprises an engine core casing 53, wherein the bypass duct 104 extends between the engine core casing 53 and an engine casing 51. Upstream of the engine casing 51 is located a fan casing 52 which extends around the fan 102.

The supersonic gas turbine engine of FIG. 2 comprises a supersonic intake 101 that serves to slow the air down to a speed compatible with the gas turbine engine. The intake 101 is located upstream of the fan 102 comprises bleed holes 1010 that serve to extract air from the intake 101. Such extraction of air serves to control the initiation and angle of shock waves that occur in the intake 101 when the air is slowed down. There may be provided additional bleed holes 1010 and/or the bleed holes 1010 may be arranged at different locations in the supersonic intake 101 than is shown in FIG. 2.

The extracted air is guided from the intake 101 to an annular tertiary airflow duct 3 which extends between the engine casing 51 and the nacelle 1 of the supersonic gas turbine engine. The tertiary airflow duct 3 also extends between the fan casing 52 and the nacelle. In the context of the present description the tertiary airflow duct 3 is defined by any duct structure that serves to guide the bleed air in the axial direction of the gas turbine engine.

The tertiary airflow duct 3 ends in a nozzle 35 depicted schematically. The nozzle 35 may be a separate nozzle of the tertiary airflow duct 3 or a nozzle formed commonly with the bypass duct 104 and/or the primary duct.

The extracted air flows as tertiary airflow A in the axial direction within the tertiary airflow duct 3. This air is the coolest air available in the supersonic gas turbine engine at supersonic conditions as it has only been compressed through supersonic shock. Different than air flowing in the bypass channel 104, the tertiary airflow 3 has not been compressed by the fan 102.

In the tertiary airflow duct 3, there is arranged a heat exchanger 4 that is depicted in a schematic manner. The heat exchanger serves to cool a fluid of a fluid system of the gas turbine engine such as oil of an oil system of the gas turbine engine, as will be explained in more detail with respect to FIGS. 18 to 21. As the tertiary airflow A consists of the coolest air on the engine installation, efficient cooling of the fluid in the heat exchanger 4 is provided for.

Figure 3:
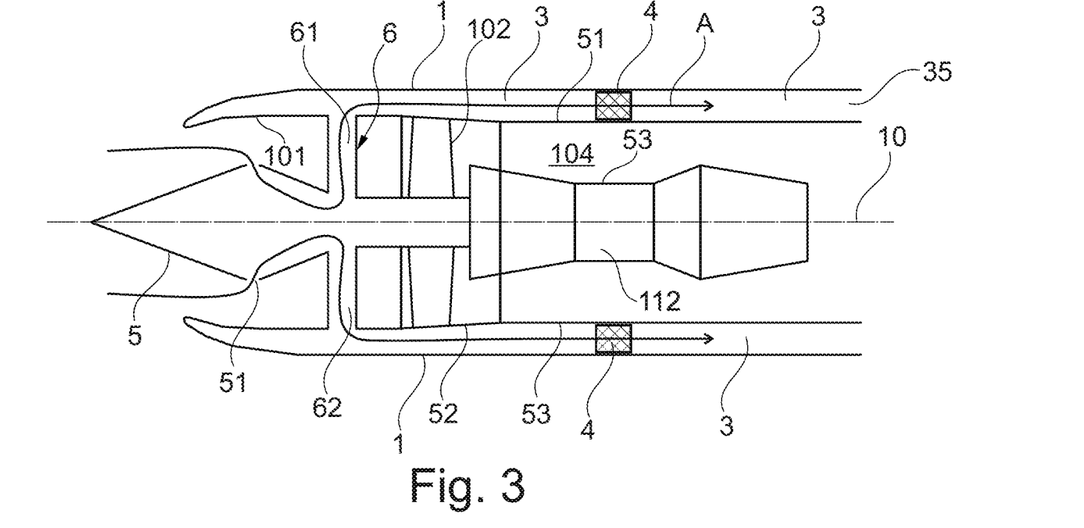
FIG. 3 is a schematic sectional side view of a second embodiment of a supersonic gas turbine engine that comprises a tertiary airflow duct with a heat exchanger, wherein the gas turbine engine comprises a second type of intake that extracts air and guides it to the tertiary airflow duct.

FIG. 3 shows a second embodiment of a supersonic gas turbine engine. The difference to the embodiment of FIG. 2 lies in the construction of the inlet 101. The other parts of the gas turbine engine are similar and, accordingly, reference is made in this respect to the description of FIG. 2.

The embodiment of FIG. 3 comprises a supersonic intake 101 that includes a centerbody 5. The centerbody 5 is arranged rotationally symmetric along the engine axis 10. It is attached to and extends from a front mounting frame 6 that is located upstream of a fan 102. The front mounting frame 6 comprises struts 61 that connect the front mounting frame 6 with the fan casing 52. Such centerbody 5 is also referred to as center spike or inlet cone. Such centerbody is designed to control the airflow into the engine by introducing oblique and normal shock waves that slow the air down to a speed that is compatible with the engine.

The centerbody 5 comprises bleed holes 51 which are depicted only schematically in FIG. 3. The bleed holes 51 may be arranged around the circumference of the wall of the centerbody 5. There may be provided additional bleed holes and/or the bleed holes 51 may be arranged at different locations than is shown in FIG. 3. One purpose of the bleed holes 51 is to extract air from the airflow that flows into intake 101 to control the initiation and angle of shock waves that serve to slow the air down to a speed compatible with the gas turbine engine. At the same time, the bleed air from bleed holes 51 forms the tertiary airflow A in the tertiary airflow duct 3 and cools a heat exchanger 4 located in the tertiary airflow duct 3. Air from the bleed holes 51 flows through the struts 61 of front mounting frame 6 radially outward into the tertiary airflow duct 3 and flows as tertiary airflow A in the axial direction along the length of the nacelle 1.

Figure 4:
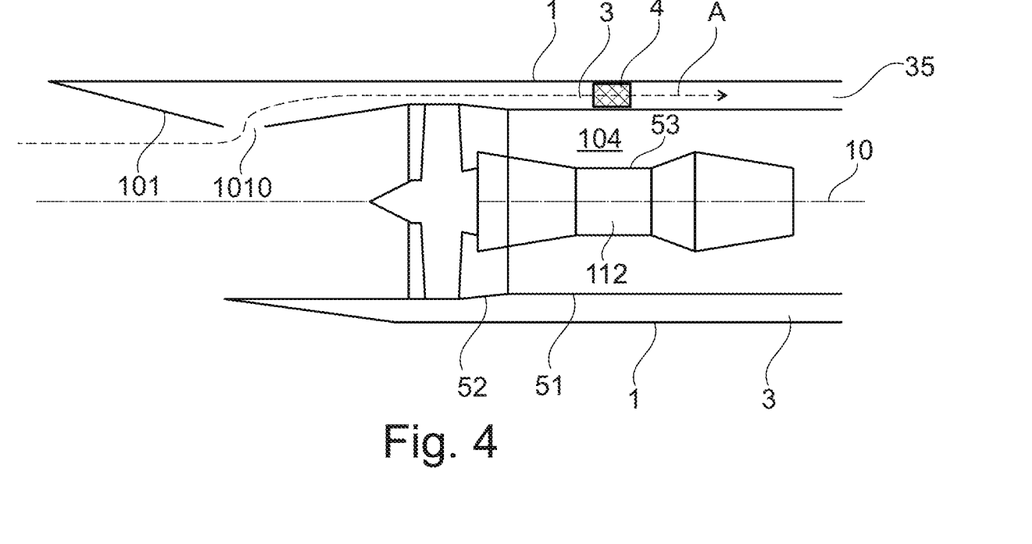
FIG. 4 is a schematic sectional side view of a third embodiment of a supersonic gas turbine engine that comprises a tertiary airflow duct with a heat exchanger, wherein the gas turbine engine comprises a third type of intake that extracts air and guides it to the tertiary airflow duct.

FIG. 4 shows a third embodiment of a supersonic gas turbine engine. The difference to the embodiment of FIGS. 2 and 3 lies in the construction of the inlet 101. The other parts of the gas turbine engine are similar and, accordingly, reference is made in this respect to the description of FIG. 2.

In FIG. 4, the inlet 101 is beveled with an upper ramp protruding from a lower ramp. In the upper ramp, bleed holes 1010 are arranged that serve to extract air from the intake 101. Such extraction of air serves to control the initiation and angle of shock waves that occur in the intake 101 when the air is slowed down. There may be provided additional bleed holes 1010 and/or the bleed holes 1010 may be arranged at different locations in the supersonic intake 101 than is shown in FIG. 4.

The gas turbine of FIG. 4 could be placed upside down in which case the protruding ramp would be the lower ramp.

The bleed air from bleed holes 1010 is guided into a tertiary airflow duct 3. A heat exchanger 4 is located in the tertiary airflow duct 3 and cooled by the tertiary airflow A. In the embodiment of FIG. 4, the tertiary airflow A is not symmetrical in the circumferential direction, as bleed holes 1010 are only provided in the upper protruding ramp of the intake 101. Therefore, a heat exchanger 4 is located in areas along the circumference of the tertiary airflow path 3 only in which a substantial amount of tertiary airflow A is present.

It is pointed out that the form of the supersonic intake 101 has been described by way of three examples in FIGS. 2 to 4. However, these examples are exemplary only and other forms of supersonic intakes 101 may be implemented.

Figure 5:
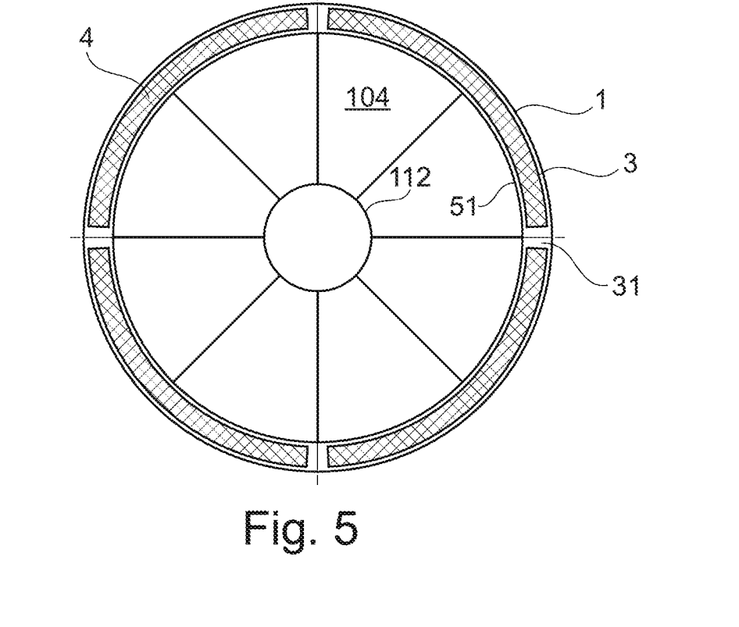
FIG. 5 is a cross-sectional view of an embodiment of a tertiary airflow duct in which a plurality of arc shaped heat exchangers is arranged.

FIG. 5 shows a cross-sectional view of an embodiment of the gas turbine engine which depicts in a schematic manner the tertiary airflow path 3 which extends radially between the engine casing 51 and the nacelle 1 of the gas turbine engine. The engine core 112 and the bypass duct 104 are depicted schematically as well.

There is provided a plurality of arc shaped heat exchangers 4 that each extend about a particular angular range in the circumferential direction. In the depicted embodiment, four heat exchangers 4 are provided, each extending for about 90 degrees or less in the circumferential direction. However, less or more arc shaped heat exchangers 4 may be implemented attentively.

In the embodiment of FIG. 5, the heat exchangers 4—except for small gaps 31 which are provided between the heat exchangers—basically fill the entire annulus of the tertiary airflow duct 3 in the circumferential direction. This means that a rather high pressure drop occurs over the heat exchangers 4 depending on the size of the gaps 31 and the construction of the heat exchangers 4. It may be desirable not to block too much of the air flowing in the tertiary airflow duct 3 to be able to continue the control of shock waves in the intake 101. By varying the size of the gaps 31 and/or by using different kinds of heat exchangers 4 the pressure drop over the heat exchangers 4 and the amount of air passing the heat exchanger 4 can be adjusted.

Figure 6:
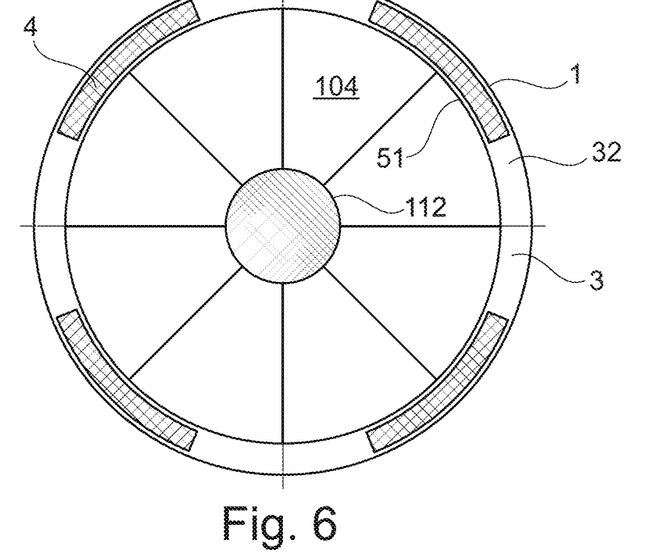
FIG. 6 is a cross-sectional view of a further embodiment of a tertiary airflow duct in which a plurality of arc shaped heat exchangers is arranged that have a gap in between them in the circumferential direction.

For example, FIG. 6 depicts an embodiment in which larger gaps 32 are provided in between arc shaped heat exchangers 4. The number of heat exchangers 4 and the size of the gaps 32 is exemplary only and different numbers of heat exchangers 4 and different gap sizes may be implemented instead.

Figure 7:
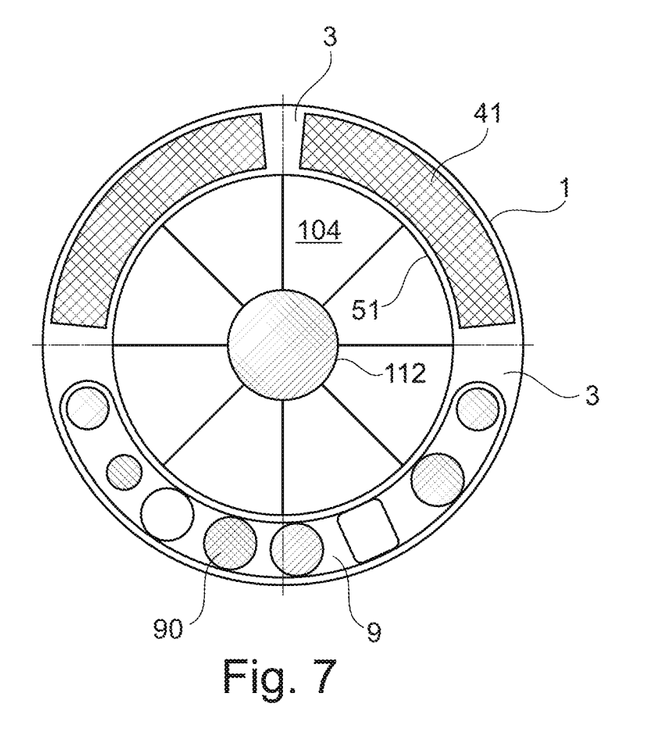
FIG. 7 is a cross-sectional view of a further embodiment of a tertiary airflow duct in which arc shaped heat exchangers are arranged in the upper half of the tertiary airflow duct and an accessory gearbox is arranged in the lower half of the tertiary airflow duct.

FIG. 7 shows an embodiment in which in addition to heat exchangers 41 an accessory gearbox 9 is mounted in the tertiary flow duct 3. In the shown embodiment, the heat exchangers 41 are located in the upper half of the tertiary airflow duct 3, wherein the accessory gearbox 9 is located in the lower half of the tertiary airflow duct 3. However, in other embodiments, the extension of the accessory gearbox 9 in the circumferential direction may be different. Also, the circumferential extension and number of heat exchangers 41 may be different. The accessory gearbox 9 comprises a plurality of accessory units 91 driven by a shaft of the accessory gearbox (not shown). Accessory units 91 may include a fuel pump, an oil pump, a hydraulic pump and/or a breather.

The accessory gearbox 9 may be mounted in the tertiary airflow duct 3 on a fan case 52 or alternatively on the engine case 51 (see FIG. 2-4). Although in the cross-sectional view of FIG. 7 depicted as being realized at the same axial position, the heat exchangers 41 and the accessory gearbox 9 may be offset in the axial direction. This also is true for the embodiments of FIGS. 9, 11 and 13 discussed further below.

Figure 8:
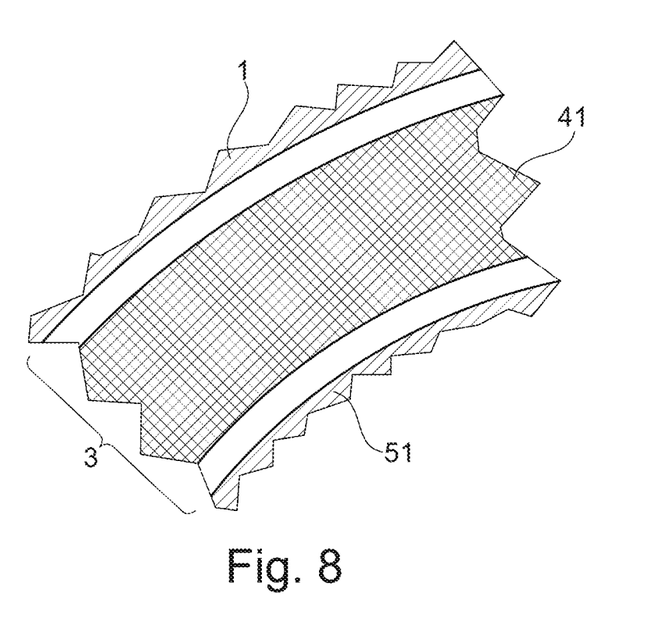
FIG. 8 is an enlarged view of a heat exchanger which extends in the radial direction between the outer wall of the engine casing and the inner wall of the nacelle, the exchanger being formed by a matrix cooler type of heat exchanger.

In the embodiment of FIG. 7, and also in the embodiments of FIGS. 3 to 6, the heat exchanger 41 basically fills the entire annulus of the tertiary airflow duct 3 in the radial direction. This is further shown in FIG. 8 which shows a detail of FIG. 7. The heat exchanger 41 may be implemented as a matrix cooler type of heat exchanger in which the heat transfer surface is formed by a 3-dimensional matrix. The heat exchanger 41 extends between the outer wall of the engine casing 51 and the inner wall of the nacelle 1, wherein both the heat exchanger 41 and the nacelle 1 may or may not comprise several parallel walls.

Figure 9:
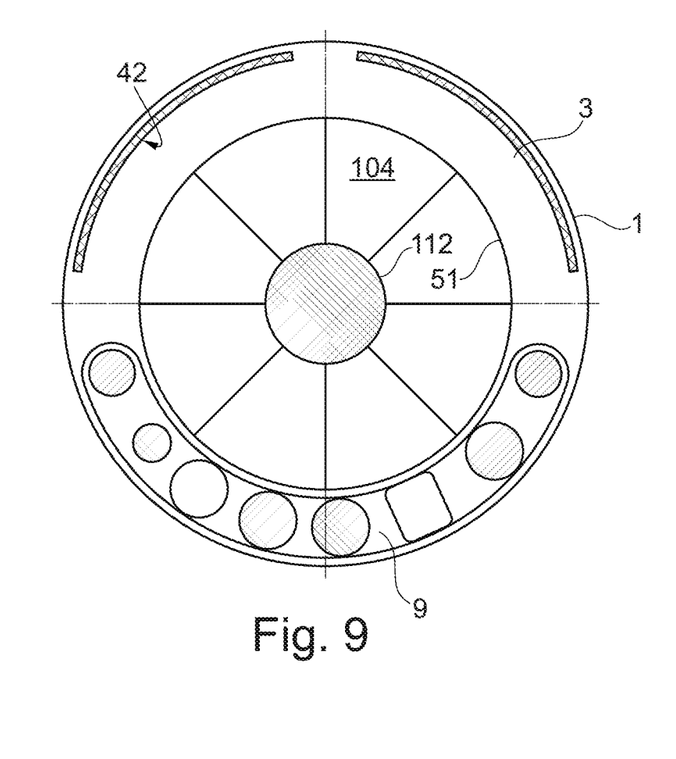
FIG. 9 is a cross-sectional view of a further embodiment of a tertiary airflow duct in which heat exchangers are arranged, wherein the heat exchangers are formed by a surface cooler type of heat exchanger and mounted to the inner wall of the nacelle of the gas turbine engine.
Figure 10:
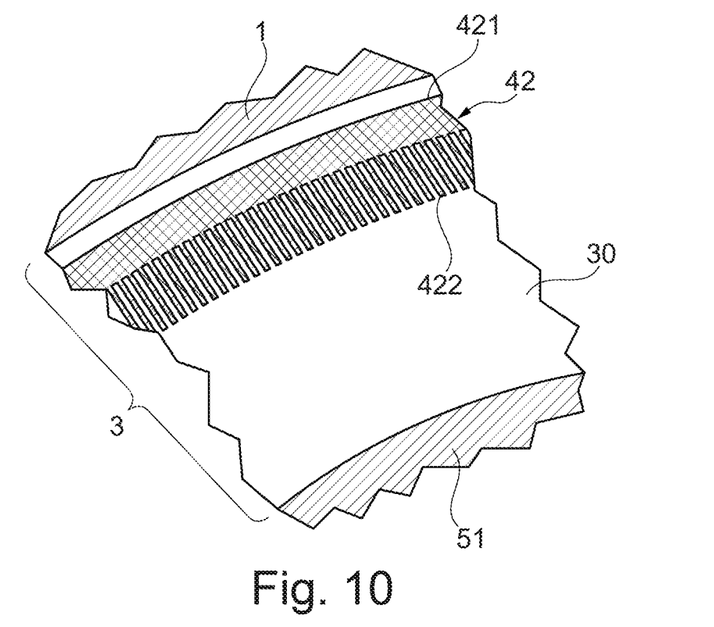
FIG. 10 is an enlarged view of the heat exchanger of FIG. 8.

FIG. 9 depicts an embodiment similar to the embodiment of FIG. 7, wherein the heat exchangers 42 are formed differently. The heat exchangers 42 of FIG. 4 are of the surface cooler type and mounted to the inner wall of the nacelle 1, wherein the heat exchangers 42 only partly fill the annulus of the tertiary airflow duct 3 in the radial direction. This is further shown in FIG. 10 which shows a detail of FIG. 9. The heat exchangers 42 of FIGS. 9 and 10 comprises a main heat exchanging layer 421 and cooling fins 422 which extend from layer 421 radially inward towards engine casing 51. Area 30 of the tertiary airflow duct 3 is free of material and guides the tertiary airflow irrespective of whether the heat exchangers 42 are switched on or off.

Figure 11:
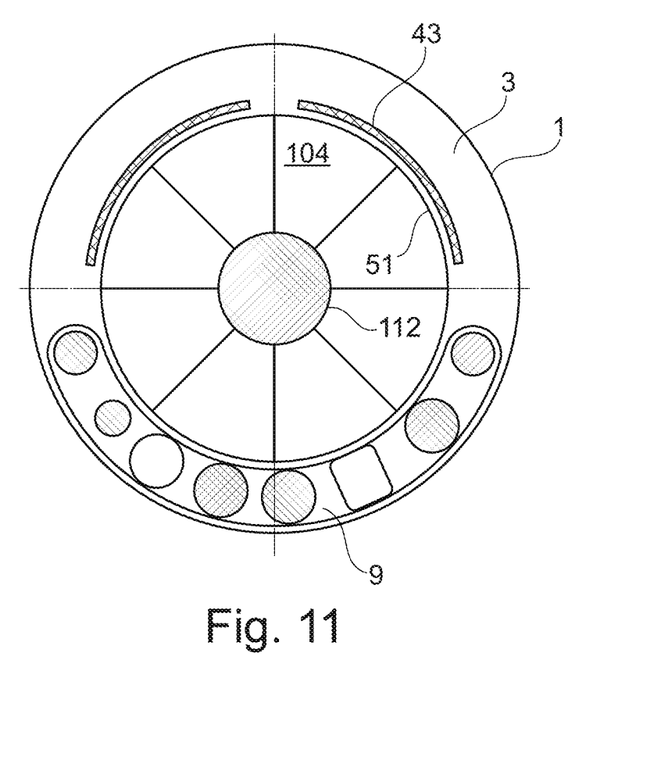
FIG. 11 is a cross-sectional view of a further embodiment of a tertiary airflow duct in which heat exchangers are arranged, wherein the heat exchangers are formed by a surface cooler type of heat exchanger and mounted to the outer wall of the engine casing.
Figure 12:
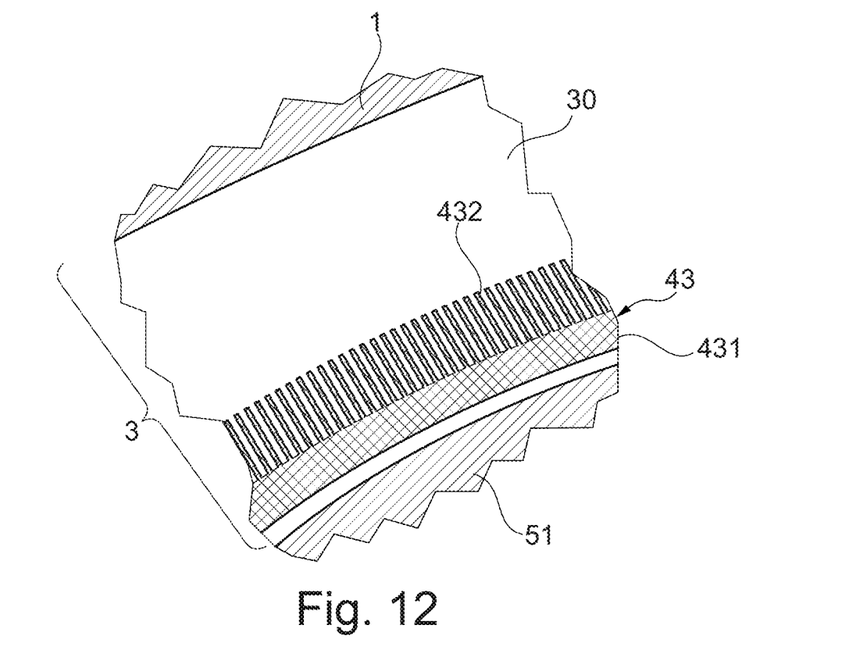
FIG. 12 is an enlarged view of the heat exchanger of FIG. 11.

FIG. 11 depicts an embodiment that differs from the embodiment of FIG. 9 in that a surface cooler type of heat exchanger 43 is mounted to the outer wall of the engine casing 51. In such embodiments, as shown in FIG. 12 which shows a detail of FIG. 11, a main heat exchanging layer 431 is located next to the outer wall of the engine casing 51, wherein cooling fins 432 extend from layer 431 radially outward towards nacelle 1. An area 30 of the tertiary airflow duct 3 is free of material.

Figure 13:
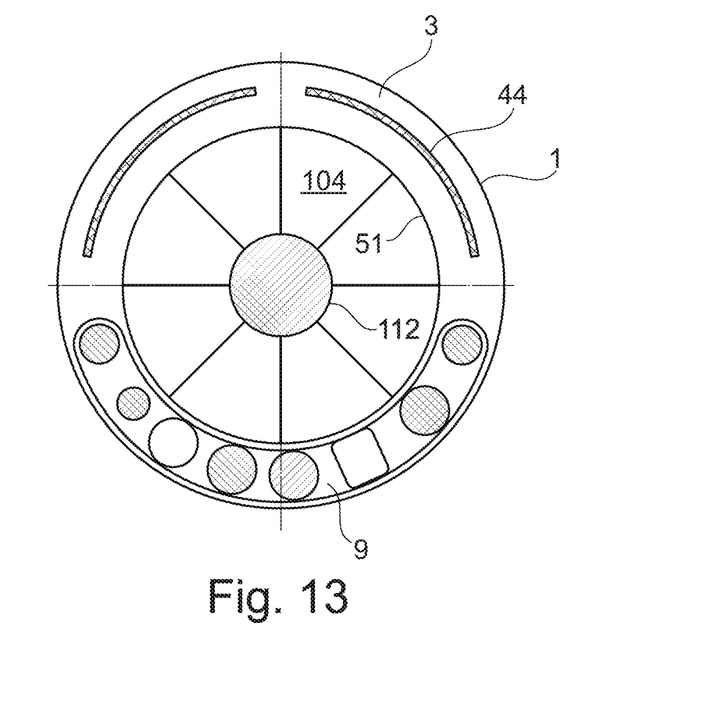
FIG. 13 is a cross-sectional view of a further embodiment of a tertiary airflow duct in which heat exchangers are arranged, wherein the heat exchangers are formed by a surface cooler type of heat exchanger and mounted midway between the engine casing and the nacelle of the gas turbine engine.
Figure 14:
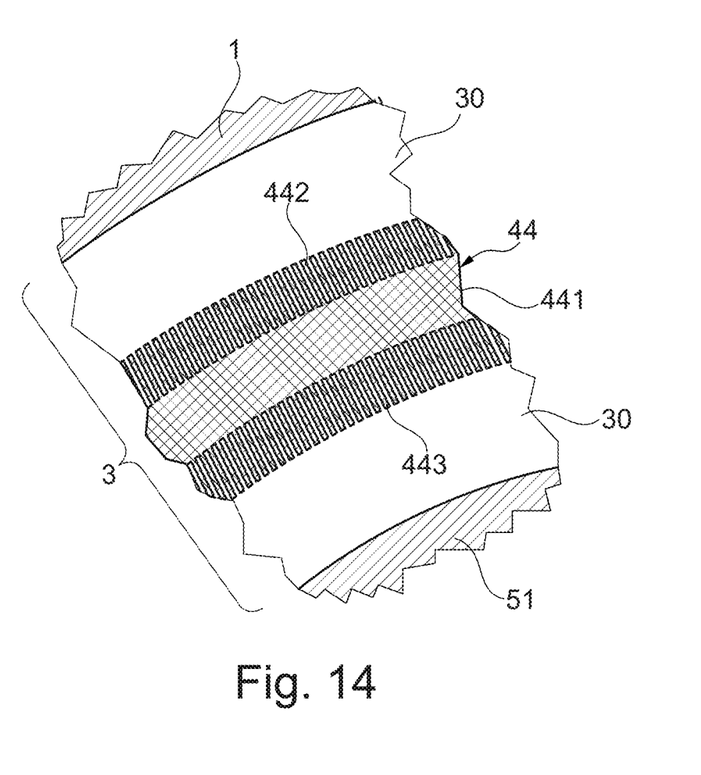
FIG. 14 is an enlarged view of the heat exchanger of FIG. 13.

FIG. 13 depicts an embodiment that differs from the embodiment of FIGS. 9 and 11 in that a surface cooler type of heat exchanger 44 is mounted midway between the engine casing 51 and the nacelle 1. As further shown in FIG. 14, which shows a detail of FIG. 13, the midway mounted heat exchangers 44 comprises a main heat exchanging layer 441 to both sides of which cooling fins 442, 443 extend, such that cooling of the main heat exchanging layer 441 takes place on both of its sides. This way, a particularly effective cooling by means of a surface cooler type of heat exchanger can be achieved.

Figure 15:
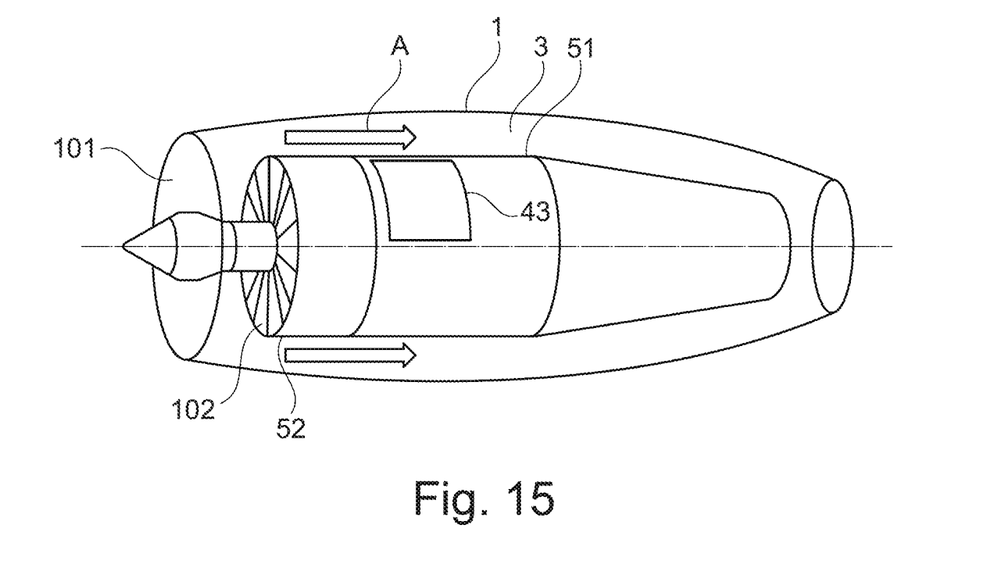
FIG. 15 shows schematically a gas turbine engine in which a surface cooler type or plate cooler type heat exchanger is mounted to the outer wall of the engine casing of the gas turbine engine.

FIG. 15 schematically depicts a supersonic gas turbine engine having a tertiary airflow duct 3 extending between an engine casing 51 and a nacelle 1 of the gas turbine engine. A tertiary airflow A is extracted from the intake 101 and flows in the axial direction within the tertiary airflow duct 3. As schematically shown, at least one heat exchanger 43 is mounted to the outer wall of the engine casing 51, within tertiary airflow duct 3. The implementation of the heat exchanger 43 may be similar to that shown in FIGS. 11 and 12. The heat exchanger 43 is arc shaped. Several of such heat exchangers 43 may be provided.

Figure 16:
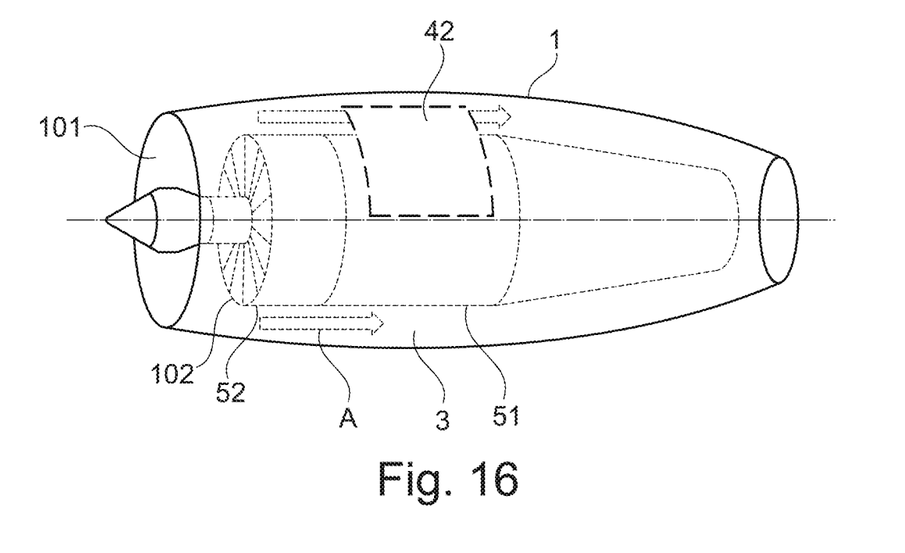
FIG. 16 shows schematically a gas turbine engine in which a surface cooler type or plate cooler type heat exchanger is mounted to the inner wall of the nacelle of the gas turbine engine.

FIG. 16 schematically depicts a further supersonic gas turbine engine having a tertiary airflow duct 3 extending between an engine casing 51 and a nacelle 1 of the gas turbine engine. A tertiary airflow A is extracted from the intake 101 and flows in the axial direction within the tertiary airflow duct 3. As schematically shown, at least one heat exchanger 42 is mounted to the inner wall of the nacelle 1, within tertiary airflow duct 3. The implementation of the heat exchanger 42 may be similar to that shown in FIGS. 9 and 10. The heat exchanger 42 is arc shaped. Several of such heat exchangers 42 may be provided.

Figure 17:
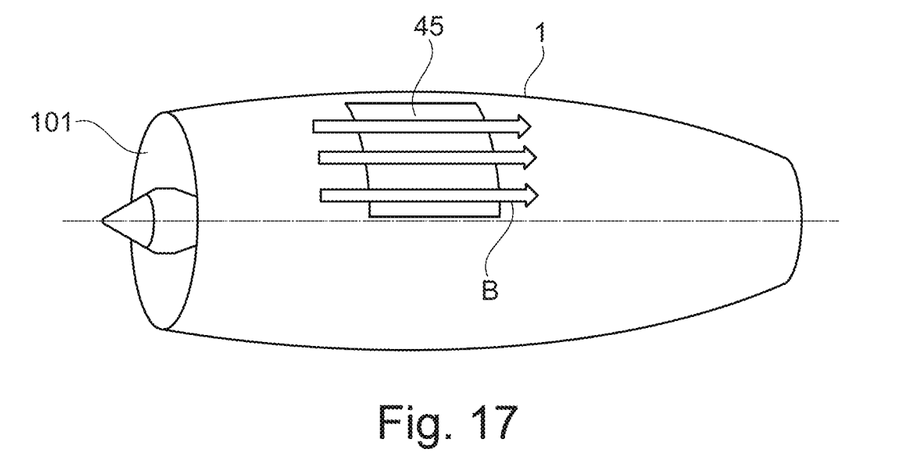
FIG. 17 shows schematically a gas turbine engine in which a surface cooler type or plate cooler type heat exchanger is arranged on the outer surface of the nacelle of the gas turbine engine.

FIG. 17 schematically depicts a further supersonic gas turbine engine. The supersonic gas turbine engine may have a tertiary airflow duct as discussed with respect to FIGS. 2-4, 15, 16. However, this is not necessarily the case. A surface cooler or plate cooler type of heat exchanger 45 is attached to the outer wall of nacelle 1. Accordingly, the surface of heat exchanger 45 that is cooled is cooled by the external boundary layer flow B of nacelle 1. This boundary layer flow B is typically subsonic.

According to this embodiment, the fluid in the heat exchanger 45 is cooled by an external airflow B. To provide for a smooth outer surface of nacelle 1 and to avoid the creation of turbulence by heat exchanger 45, the heat exchanger 45 outer surface is formed such that it exactly follows the outer design of the nacelle 1. In one embodiment, the heat exchanger 45 is formed by a plate cooler. In another embodiment, the heat exchanger 45 is formed as a surface cooler, wherein cooling fins that may be provided similar as in the embodiment of FIG. 10 in such case extend towards the interior of the nacelle 1. In case the supersonic gas turbine engine includes a tertiary airflow duct, the cooling fins are cooled by the tertiary airflow. Accordingly, in such embodiment, the main cooling surface is arranged in the nacelle outer wall and cooled by the external boundary layer flow B, wherein additional cooling by cooling fins is effected by the tertiary airflow.

Figure 18:
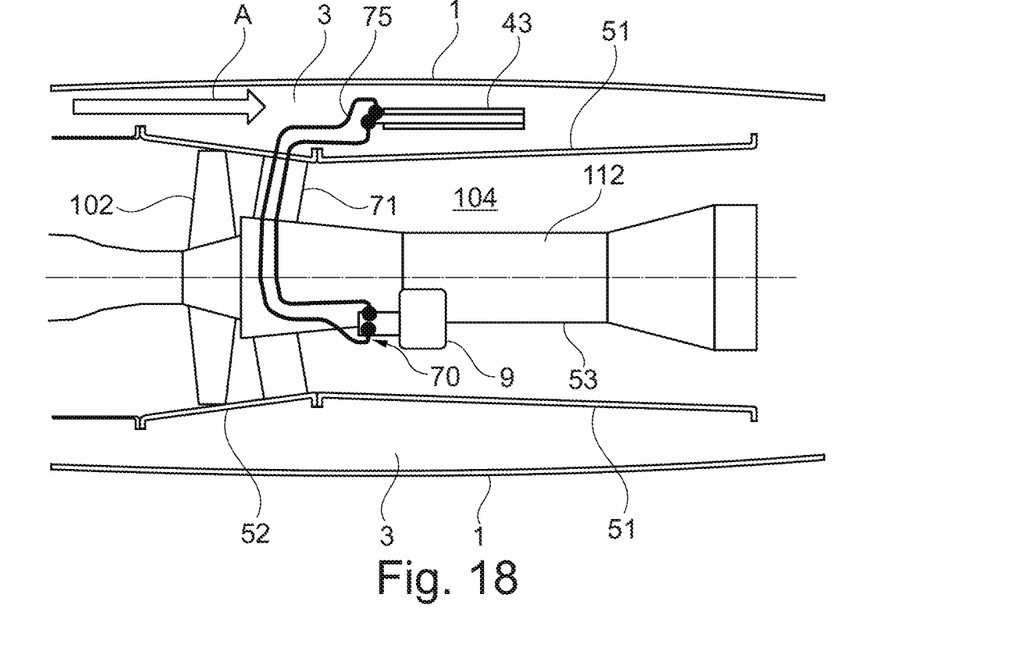
FIG. 18 shows schematically an oil system of a supersonic gas turbine engine which comprises an accessory gearbox mounted to a core engine casing and a heat exchanger arranged in the tertiary airflow duct, wherein fluid pipes between the accessory gearbox and the heat exchanger are guided through outlet guide vanes.

FIG. 18 shows a first embodiment of the implementation of a fluid system, wherein the fluid of the fluid system is cooled by a tertiary airflow A as discussed with respect to FIGS. 2 to 16 or, alternatively, is cooled by an external boundary layer flow as discussed with respect to FIG. 17. The fluid system may be an oil system.

The fluid system 70 includes a fluid pump located in an accessory gearbox 9, fluid pipes 75 and a heat exchanger 43. Regarding the general construction of the supersonic gas turbine engine of FIG. 18, reference is made to the description of FIGS. 2 to 4.

It is pointed out that the complete fluid system 70 may include further components and accessories not shown in FIG. 18. For example, in case of an oil system, the oil after cooling is supplied to components of the gas turbine engine such as bearing chambers.

The heat exchanger 43 of the embodiment of FIG. 18 is implemented in a manner similar to the mid-mounted heat exchanger shown in FIG. 13. However, any other location and implementation of a heat exchanger in the tertiary airflow duct 3 is possible. The accessory gearbox 9 with the fluid pump (in the following referred to as "fluid pump/accessory gearbox") is mounted to the engine core 112. The fluid pipes 75 are guided through the outlet guide vanes 71 from the engine core 112 to the heat exchanger 43 located in the tertiary airflow duct 3 and back to the fluid pump/accessory gearbox 9. The outlet guide vanes 71 are located downstream of the fan 102 in the bypass duct 104.

Figure 19:
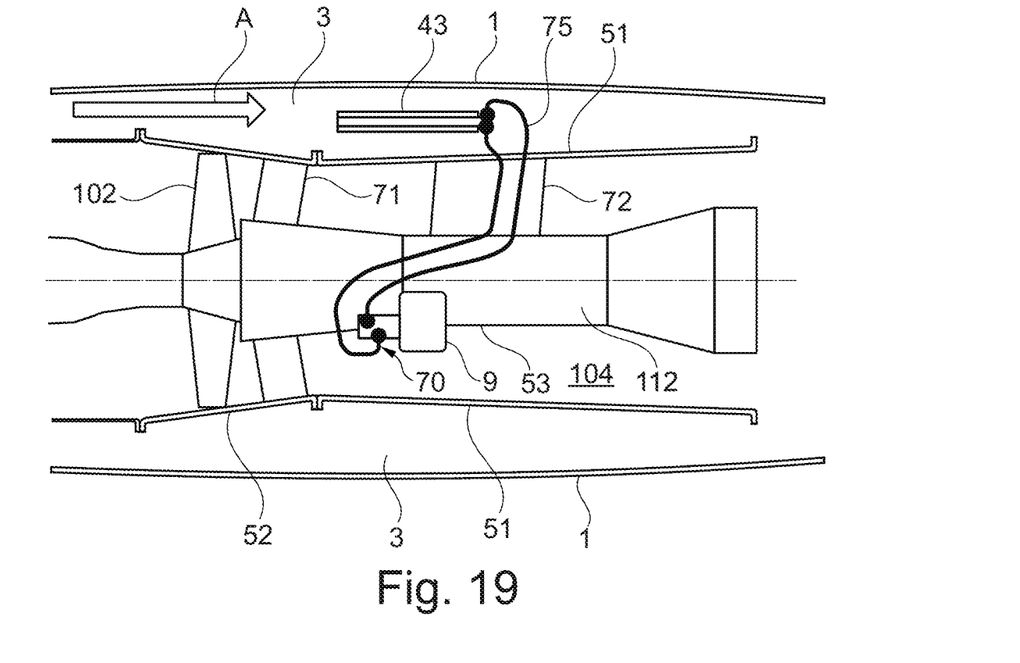
FIG. 19 shows schematically an oil system of a supersonic gas turbine engine which comprises an accessory gearbox mounted to a core engine casing and a heat exchanger arranged in the tertiary airflow duct, wherein fluid pipes between the accessory gearbox and the heat exchanger are guided through a services splitter faring.

FIG. 19 shows an implementation of a fluid system in which the fluid pipes 75 are guided through a non-structural strut 72 which is located downstream of the outlet guide vanes 71 in the bypass duct 104. Such non-structural strut 72 is also referred to as a services splitter faring. The services splitter faring does not have any structural function but only serves as an aerodynamic protection and passageway for pipes and cables that need to cross the bypass duct 104.

Figure 20:
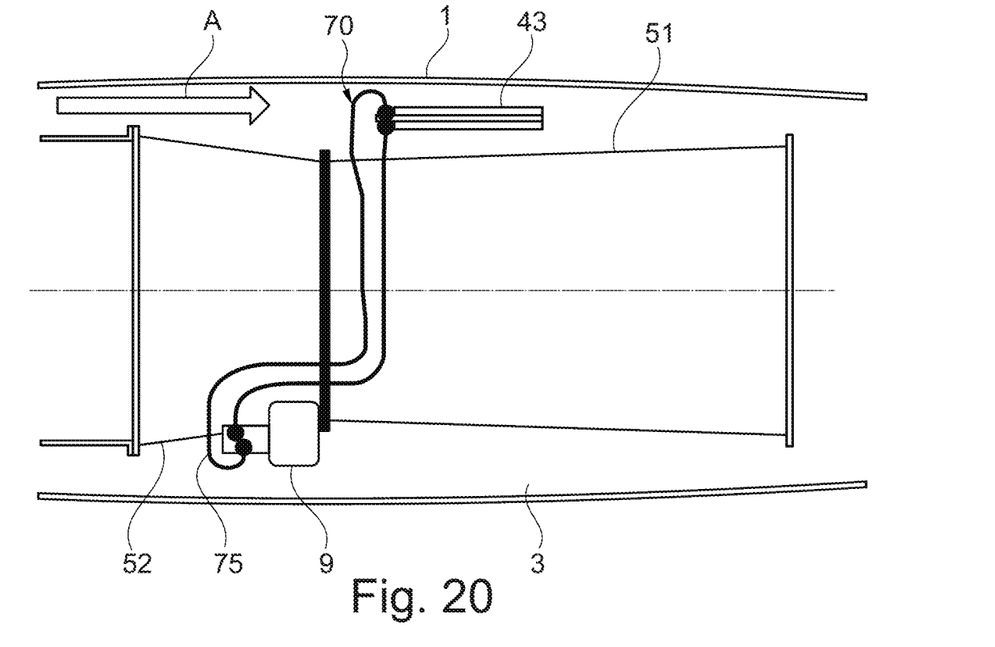
FIG. 20 shows schematically an oil system of a supersonic gas turbine engine which comprises an accessory gearbox mounted to a fan casing and a heat exchanger arranged in the tertiary airflow duct, wherein fluid pipes between the accessory gearbox and the heat exchanger are guided around the outside of the engine casing.

FIG. 20 shows an implementation of a fluid system in which the fluid pump/accessory gearbox 9 is mounted to the fan case 52 and, accordingly, lies in the tertiary airflow duct 3. In such case, the fluid pipes 75 only need to be guided around the outside of the engine casing to the heat exchangers 43, without any need to pass the bypass channel.

Figure 21:
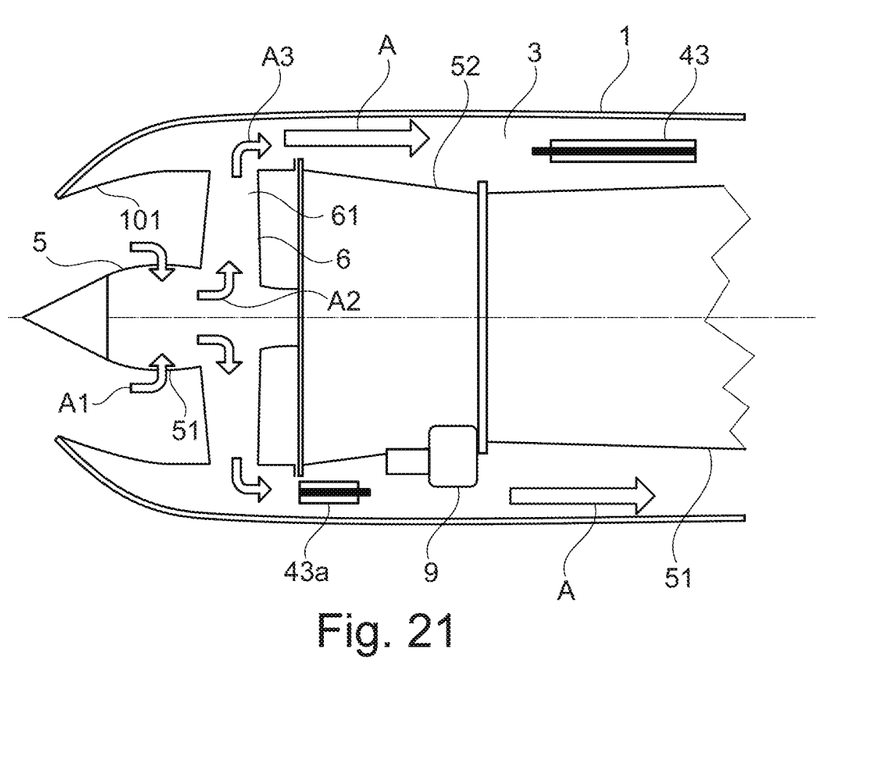
FIG. 21 shows schematically an oil system of a supersonic gas turbine engine which comprises an accessory gearbox mounted to a fan casing, a heat exchanger arranged downstream of the accessory gearbox in the tertiary airflow duct and a further heat exchanger arranged upstream of the accessory gearbox in the tertiary airflow duct.

FIG. 21 shows a further implementation of a fluid system in which the fluid pump/accessory gearbox 9 is mounted to the fan case 52. The gas turbine engine depicted in FIG. 21 comprises an intake 101 similar to the intake of FIG. 3, the intake 101 having a centerbody 5 with bleed air openings 51 through which bleed air is extracted from the inlet and guided through struts 61 of a front mounting frame 6 to a tertiary airflow duct 3, see arrows A1, A2, A3.

A heat exchanger 43 is located downstream of the fluid pump/accessory gearbox 9 in the tertiary airflow duct 3 and connected to the fluid pump/accessory gearbox 9 by means of fluid pipes as described with respect to FIG. 20. In addition, a further heat exchanger 43a is located upstream of the pump/accessory gearbox 9 in the tertiary airflow duct 3, namely, in the area of the tertiary airflow duct 3 formed between the fan case 52 and the nacelle 1. As the further heat exchanger 43a is located upstream of the fluid pump/accessory gearbox 9, the air of tertiary airflow A that interacts with heat exchanger 43a is even cooler than air of the tertiary airflow A downstream of the fluid pump/accessory gearbox 9, such that particular effective cooling takes place in further heat exchanger 43a. The further heat exchanger 43a is provided for additional cooling of the fluid system. In other embodiments, only heat exchanger 43a upstream of fluid pump/accessory gearbox 9 is provided, without implementing a heat exchanger 43 downstream of the fluid pump/accessory gearbox 9. This depends on the amount of required cooling, the kind of heat exchanger that is used and the space available for arranging heat exchangers.

It should be understood that the above description is intended for illustrative purposes only, and is not intended to limit the scope of the present disclosure in any way. Also, those skilled in the art will appreciate that other aspects of the disclosure can be obtained from a study of the drawings, the disclosure and the appended claims. All methods described herein can be performed in any suitable order unless otherwise indicated herein or otherwise clearly contradicted by context. Various features of the various embodiments disclosed herein can be combined in different combinations to create new embodiments within the scope of the present disclosure. In particular, the disclosure extends to and includes all combinations and sub-combinations of one or more features described herein. Any ranges given herein include any and all specific values within the range and any and all sub-ranges within the given range.

The invention claimed is:

1. A supersonic gas turbine engine for an aircraft comprising:
a nacelle,
a fan,
an engine core located downstream of the fan, the engine core comprising a primary duct configured to guide a core airflow through the engine core,
a bypass duct located downstream of the fan, the bypass duct extending between the engine core and an engine casing and being configured to guide a bypass airflow through the bypass duct,
an intake located upstream of the fan, and
a tertiary airflow duct extending between the engine casing and the nacelle and being configured to guide a tertiary airflow,
wherein the intake is configured to guide a portion of air entering the intake to the tertiary airflow duct, the portion of air flowing as the tertiary airflow through the tertiary airflow duct,
wherein at least one heat exchanger is mounted in the tertiary airflow duct;
wherein the intake comprises an intake centerbody with bleed holes, wherein bleed air from the intake centerbody bleed holes is guided through a front mounting frame located upstream of the fan to the tertiary airflow duct, the front mounting frame comprising struts connecting the front mounting frame with a fan casing.

2. The gas turbine engine of claim 1, wherein the at least one heat exchanger fills an entire annulus of the tertiary airflow duct in a circumferential direction.

3. The gas turbine engine of claim 1, wherein the at least one heat exchanger only partly fills an annulus of the tertiary airflow duct in a circumferential direction.

4. The gas turbine engine of claim 3, wherein the at least one heat exchanger includes a plurality of heat exchangers are mounted in the tertiary airflow duct, wherein the plurality of heat exchangers are arranged to be separated by gaps in the circumferential direction.

5. The gas turbine engine of claim 1, wherein the at least one heat exchanger includes at least one arc shaped heat exchanger positioned in the tertiary airflow duct.

6. The gas turbine engine of claim 1, wherein the at least one heat exchanger fills an entire annulus of the tertiary airflow duct in a radial direction.

7. The gas turbine engine of claim 1, wherein the at least one heat exchanger only partly fills an annulus of the tertiary airflow duct in a radial direction.

8. The gas turbine engine of claim 7, wherein the at least one heat exchanger is mounted to an inner wall of the nacelle.

9. The gas turbine engine of claim 7, wherein the at least one heat exchanger is mounted to an outer wall of the engine casing.

10. The gas turbine engine of claim 7, wherein the at least one heat exchanger is located midway between the engine casing and the nacelle.

11. The gas turbine engine of claim 1, wherein an inner wall of the intake comprises bleed holes, wherein bleed air from the intake bleed holes is guided to the tertiary airflow duct.

12. The gas turbine engine of claim 1, wherein the at least one heat exchanger extends over a part of a circumference of the tertiary airflow duct, wherein an accessory gearbox is mounted in and extends in another part of the circumference of the tertiary airflow duct.

13. The gas turbine engine of claim 1, wherein the at least one heat exchanger is a matrix cooler heat exchanger.

14. The gas turbine engine of claim 1, wherein the at least one heat exchanger is a surface cooler heat exchanger or a plate cooler heat exchanger.

15. The gas turbine engine of claim 14, wherein the surface cooler heat exchanger comprises cooling fins mounted to one side or both sides of the surface cooler heat exchanger.

16. The gas turbine engine of claim 1, wherein the at least one heat exchanger is connected to a fluid system, wherein fluid of the fluid system is cooled in the at least one heat exchanger by the tertiary airflow.

17. The gas turbine engine of claim 16, and further comprising fluid pipes and/or other conductors guided from an accessory gearbox that is mounted to a core engine casing through struts or vanes across the bypass duct to the at least one heat exchanger.

18. The gas turbine engine of claim 16, and further comprising fluid pipes and/or other conductors guided from an accessory gearbox around an outside of the engine casing to the at least one heat exchanger, wherein the accessory gearbox is mounted in the tertiary airflow duct to a fan casing located upstream of the engine casing or to the engine casing.

19. A supersonic gas turbine engine for an aircraft comprising:
a nacelle,
a fan,
an engine core located downstream of the fan, the engine core comprising a primary duct configured to guide a core airflow through the engine core,
a bypass duct located downstream of the fan, the bypass duct extending between the engine core and an engine casing and being configured to guide a bypass airflow through the bypass duct,
an intake located upstream of the fan, and
a tertiary airflow duct extending between the engine casing and the nacelle and being configured to guide a tertiary airflow,
wherein the intake is configured to guide a portion of air entering the intake to the tertiary airflow duct, the portion of air flowing as the tertiary airflow through the tertiary airflow duct,
wherein at least one heat exchanger is mounted in the tertiary airflow duct;
wherein the at least one heat exchanger extends over a part of a circumference of the tertiary airflow duct, wherein an accessory gearbox is mounted in and extends in another part of the circumference of the tertiary airflow duct.

20. A supersonic gas turbine engine for an aircraft comprising:
a nacelle,
a fan,
an engine core located downstream of the fan, the engine core comprising a primary duct configured to guide a core airflow through the engine core,
a bypass duct located downstream of the fan, the bypass duct extending between the engine core and an engine casing and being configured to guide a bypass airflow through the bypass duct,
an intake located upstream of the fan, and
a tertiary airflow duct extending between the engine casing and the nacelle and being configured to guide a tertiary airflow,
wherein the intake is configured to guide a portion of air entering the intake to the tertiary airflow duct, the portion of air flowing as the tertiary airflow through the tertiary airflow duct,
wherein at least one heat exchanger is mounted in the tertiary airflow duct;
fluid pipes and/or other conductors guided from an accessory gearbox around an outside of the engine casing to the at least one heat exchanger, wherein the accessory gearbox is mounted in the tertiary airflow duct to a fan casing located upstream of the engine casing or to the engine casing.

* * * * *